(12) United States Patent
Hubmann

(10) Patent No.: US 12,338,849 B2
(45) Date of Patent: Jun. 24, 2025

(54) SCREW DRIVE

(71) Applicant: AVVIO GMBH & CO KG, Graz (AT)

(72) Inventor: Gerhard Hubmann, Graz (AT)

(73) Assignee: AVVIO GMBH & CO KG, Graz (AT)

(*) Notice: Subject to any disclaimer, the term of this patent is extended or adjusted under 35 U.S.C. 154(b) by 320 days.

(21) Appl. No.: 17/757,423

(22) PCT Filed: Dec. 17, 2020

(86) PCT No.: PCT/AT2020/060475
§ 371 (c)(1),
(2) Date: Jun. 15, 2022

(87) PCT Pub. No.: WO2021/119708
PCT Pub. Date: Jun. 24, 2021

(65) Prior Publication Data
US 2023/0349412 A1  Nov. 2, 2023

(30) Foreign Application Priority Data
Dec. 20, 2019 (AT) .................................. 50246/2019

(51) Int. Cl.
*F16B 35/06* (2006.01)
*F16B 23/00* (2006.01)

(52) U.S. Cl.
CPC ...... *F16B 23/0015* (2013.01); *F16B 23/0023* (2013.01); *F16B 23/003* (2013.01)

(58) Field of Classification Search
CPC . F16B 23/0015; F16B 23/003; F16B 23/0023
See application file for complete search history.

(56) References Cited

U.S. PATENT DOCUMENTS

| | | | | |
|---|---|---|---|---|
| 3,175,593 | A * | 3/1965 | Launay | B25B 15/007 |
| | | | | 81/436 |
| 2005/0172762 | A1* | 8/2005 | Suzuki | B25B 15/005 |
| | | | | 81/460 |
| 2005/0209592 | A1 | 9/2005 | Schlapfer et al. | |
| 2007/0037121 | A1* | 2/2007 | Carter | A61C 8/0089 |
| | | | | 433/173 |
| 2009/0023109 | A1* | 1/2009 | Jinton | A61B 17/8615 |
| | | | | 433/174 |
| 2019/0219088 | A1* | 7/2019 | Perego | B25B 15/005 |
| 2020/0232497 | A1* | 7/2020 | Hsieh | F16B 21/18 |

FOREIGN PATENT DOCUMENTS

| | | |
|---|---|---|
| DE | 19928431 A1 | 12/1999 |
| EP | 2278175 A2 | 1/2011 |
| FR | 2314645 A7 | 1/1977 |

OTHER PUBLICATIONS

International Search Report, EP International Search Authority, mailed Feb. 23, 2021, from PCT/AT2020/060475.

* cited by examiner

*Primary Examiner* — Kristina R Fulton
(74) *Attorney, Agent, or Firm* — Workman Nydegger

(57) ABSTRACT

A screw head bush for a screw, wherein the screw head bush has an external portion and an internal portion following the external portion, wherein the external portion has a larger diameter than the internal portion and the external portion is configured essentially as a truncated cone tapering towards the internal portion and the internal portion is configured as engagement geometry for the rotationally fixed accommodation of a screw head drive.

10 Claims, 12 Drawing Sheets

SCREW DRIVE

The invention relates to a screw head bush for a screw, a screw head drive, a forming tool for forming a screw head bush, a screw and a kit comprising a screw and a screw head drive.

Screw head bushes are geometrical structures, which are formed in screw heads and are intended for the rotationally fixed accommodation of a screw head drive. By means of the screw head drive, a torque may be transmitted to the screw in order to screw the screw into or out of a material. In prior art, there has been known a plurality of geometries for screw head drives and screw head bushes such as, for instance, Phillips, slot or Torx geometries. These geometries are often designated as screw drives. Geometries such as, e.g., the Torx geometry, are optimized in order to transmit high torques from the screw head drive to the screw head bush.

A disadvantage of many screw drives is that in the case of an insufficiently centred orientation, for example a tilted orientation, of the screw head drive in regard to the screw head bush there is established a form-fit between the screw head drive and the screw head bush only in an insufficient way, which is why the screw head drive may slip within the screw head bush. This may lead to damage to the screw head bush and/or the screw head drive, whereby the torque necessary for screwing in or out of a screw provided with a screw head drive cannot be transmitted anymore. This has the result that the respective screw cannot be screwed into or removed out of a material using simple means anymore, which is why a workpiece, into which the screw has been screwed into, might suffer damage or the function thereof might be impaired.

A geometry for the improved orientation of a screw head drive within a screw head bush has been known in prior art as a TTAP screw drive, having been published as the U.S. Pat. No. 6,951,158 B1. The screw head bush of the TTAP screw drive comprises an external and an internal portion, wherein the internal portion comprises a centring cone. In this way, the screw head drive is oriented centrally within the screw head bush.

The present invention is based on the task to provide an alternative geometry for screw drives, which ensure high torque transmission and, additionally, provide for a centring of the screw head drive within the screw head bush.

According to the invention this task is solved by a screw head bush having the features of the claimed invention, a screw head drive having the features of the claimed invention, a forming tool for forming a screw head bush having the features of the claimed invention, a screw having the features of the claimed invention and a kit comprising a screw and a screw head drive having the features of the claimed invention.

The embodiment according to the invention of the screw head bush for a screw comprises an external portion and an internal portion following the external portion. The external portion has a larger diameter than the internal portion in at least a first axis oriented perpendicular to a depth of the screw head bush and is configured essentially as a truncated cone tapering towards the internal portion. The internal portion is configured as engagement geometry for the rotationally fixed accommodation of a screw head drive. Due to the cone-like tapering external portion, there is provided a guide for a screw head drive, whereby there is prevented that the screw head drive is inserted into the screw head bush in an inclined way.

Furthermore, the internal portion embodied as engagement geometry is situated behind the external portion or in a larger depth than the external portion, respectively, whereby there is ensured that the screw head drive is oriented in a centred way by the external portion, before it engages the engagement geometry. In this way, wear of the engagement geometry due to screw head drives improperly inserted is being prevented.

The external portion preferably comprises a truncated cone shell inclined in regard to a cylinder shell in the range of 2.5° to 10°. In this way, there is obtained the advantage that a screw head drive that is installed in an inclined way will be oriented centrally without any huge effort.

Furthermore, the inventive screw head bush according to the preferred embodiment comprises an insertion area arranged between the external portion and the internal portion and having insertion surfaces, wherein the insertion surfaces are inclined by essentially 10° in regard to a base area of the truncated cone of the external portion. In this way, there is facilitated sliding of a contact geometry of the screw head drive into the engagement geometry of the screw head bush.

The engagement geometry of the screw head bush according to the invention is preferably a Philipps geometry, a Torx geometry or a slot geometry. Especially preferably the engagement geometry is a slot geometry passing through the screw head bush in a second axis oriented perpendicular to the depth of the screw head bush and being different from the first axis. In this way, there is obtained the advantage that a plurality of different screw drive geometries may be used within the scope of the invention.

The configuration according to the invention of the screw head drive comprises an external portion and an internal portion following the external portion, wherein the internal portion has a larger diameter than the external portion in at least a first axis oriented perpendicular to a height of the screw head drive. The internal portion is essentially configured as a truncated cone tapering towards the external portion, and the external portion comprises a contact geometry, which is configured to engage an engagement geometry of a screw head bush in a rotationally fixed way. Due to the cone-like tapering internal portion of the screw head drive, there is provided a guide, which prevents that the contact geometry of the screw head drive is inserted into an engagement geometry of a screw head bush in an inclined manner.

The internal portion of the screw head drive according to the invention preferably comprises a truncated cone shell inclined in regard to a cylinder shell in the range of 2.5° to 10°. In this way, there is gained the advantage that a screw head drive installed in an inclined way is oriented centrally without any large effort.

The screw head drive according to the invention further comprises an insertion area arranged between the external portion and the internal portion and having insertion surfaces, wherein the insertion surfaces are inclined by essentially 10° in regard to a base area of the truncated cone of the internal portion. In this way, sliding of the contact geometry of the screw head drive into the engagement geometry of the screw head bush is being facilitated.

The contact geometry of the screw head drive according to the invention is preferably a Phillips geometry, a Torx geometry or a slot geometry. Especially preferably the contact geometry is a slot geometry passing through the screw head drive in a second axis oriented perpendicular to the height of the screw head drive and being different from the first axis. In this way, there is obtained the advantage that a plurality of different screw drive geometries may be used within the scope of the invention.

The forming tool according to the invention for forming a screw head bush within a screw head comprises an external portion and an internal portion following the external portion, wherein the internal portion has a larger diameter than the external portion in at least a first axis oriented perpendicular to a height of the forming tool. The internal portion is essentially configured as a truncated cone tapering towards the external portion, and the external portion comprises a contact geometry, which is configured to form an engagement geometry for the rotationally fixed accommodation of a screw head drive within the screw head. In this way, there is obtained the advantage that a screw head bush according to the invention may be formed within a screw blank.

The internal portion of the forming tool according to the invention comprises preferably a truncated cone shell inclined in regard to a cylinder shell in the range of 2.5° to 10°. According to a preferred embodiment of the forming tool according to the invention, it further comprises an insertion area arranged between the external portion and the internal portion and having insertion surfaces, wherein the insertion surfaces are inclined by essentially 10° in regard to a base area of the truncated cone of the internal portion. In this way, simple insertion and centring of a screw head drive into and within a screw head bush is achieved.

The contact geometry of the forming tool according to the invention is preferably a Philipps geometry, a Torx geometry or a slot geometry. Especially preferably the contact geometry is a slot geometry passing through the forming tool in a second axis oriented perpendicular to the height of the forming tool and being different from the first axis. In this way, there is obtained the advantage that a plurality of different screw drive geometries may be used within the scope of the invention.

The screw according to the invention comprises a screw head bush according to the invention, which has preferably been configured with a forming tool according to the invention.

The kit according to the invention comprises a screw according to the invention and a screw head drive according to the invention. The internal portion of the screw head drive of the kit according to the invention has a truncated cone shell having a larger inclination angle in regard to a cylinder shell than a truncated cone shell of the external portion of the screw head bush of the screw of the kit according to the invention. In this way, there is achieved a friction-fit between the screw head bush of the screw and the screw head drive, thereby providing a retaining force. Due to the retaining force, for example, the screw remains stuck on the screw head drive and may be easily placed onto the workpiece. By pulling the screw head drive out of the screw head bush, this retaining force will be easily overcome. Due to the embodiment according to the invention of the kit, there is obtained the advantage that a retaining force acting on the screw may be provided without any additional magnetic elements known from prior art.

Figure 7A:
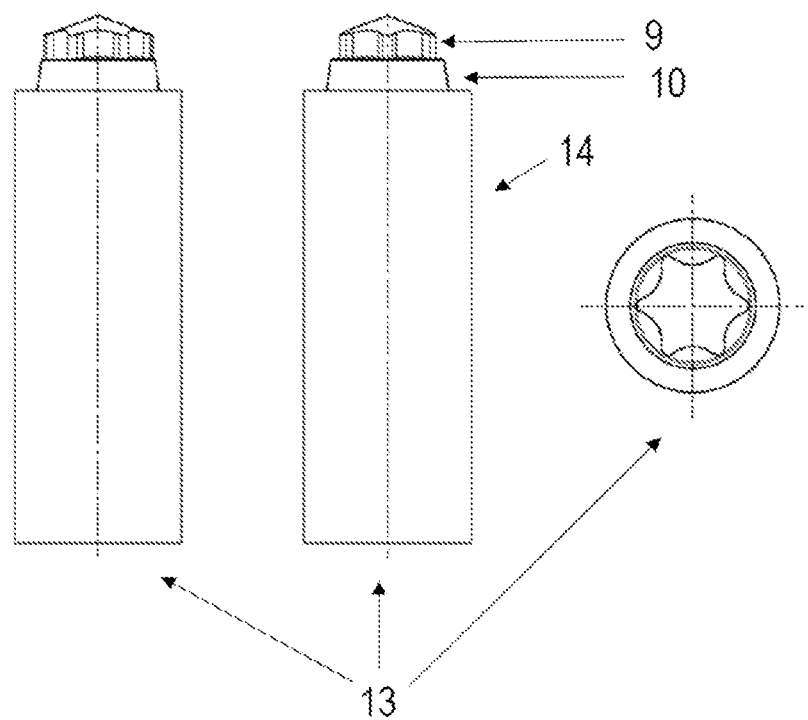
Figure 7B:
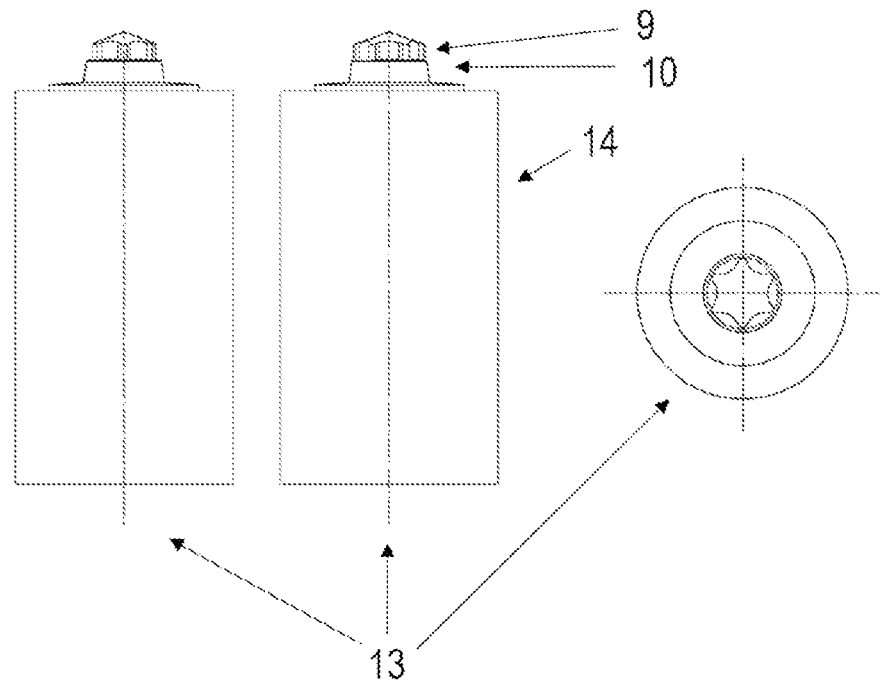

The FIGS. 7a and 7b show a forming tool according to the invention having a contact geometry in the form of a Torx geometry.

Figure 8A:
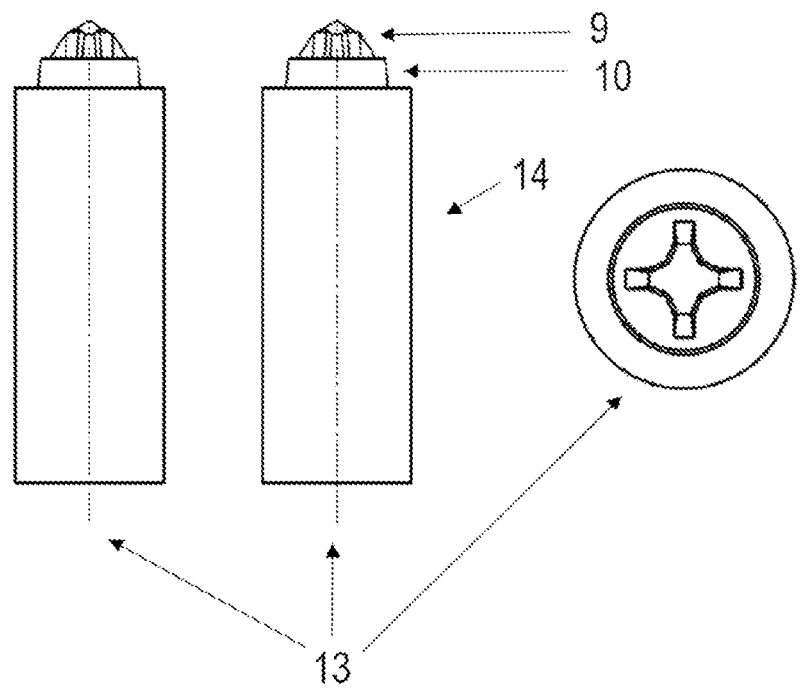
Figure 8B:
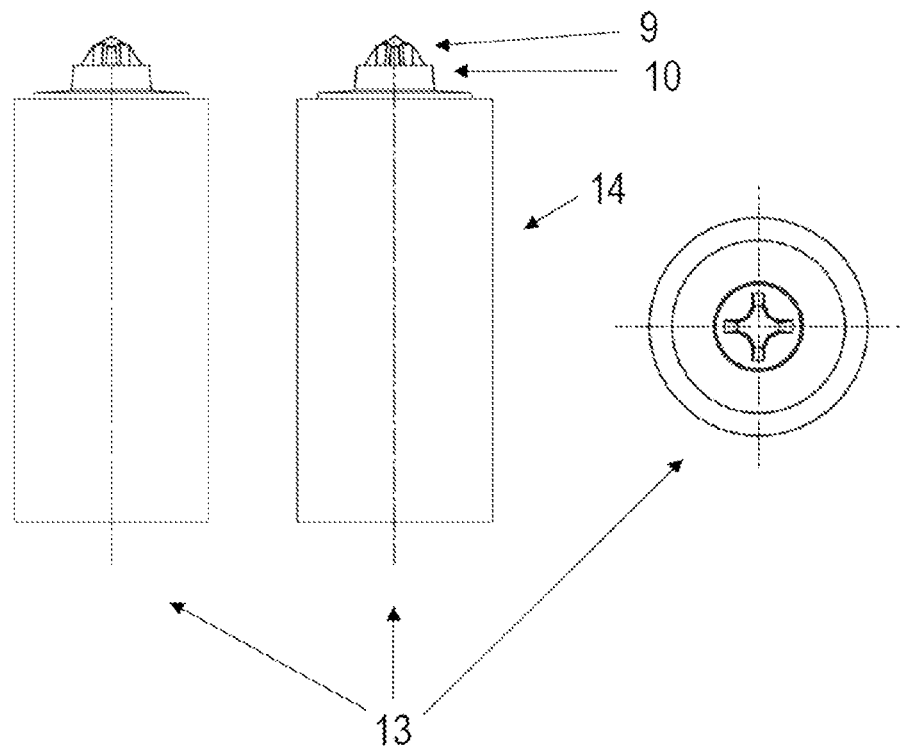

The FIGS. 8a and 8b show the forming tool according to the invention having a contact geometry in the form of a Phillips geometry.

Figure 9A:
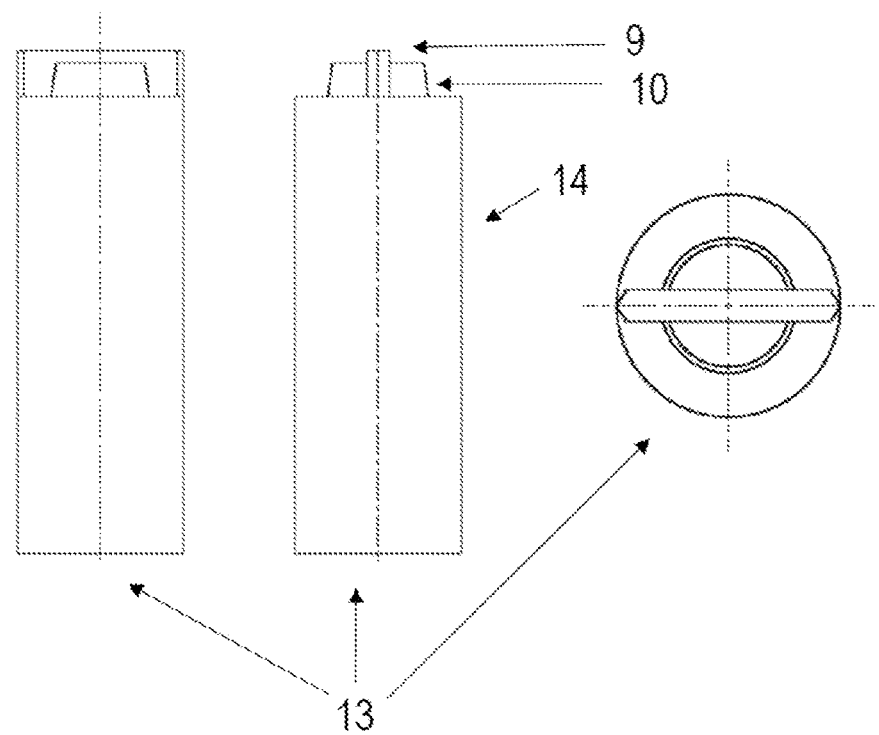
Figure 9B:
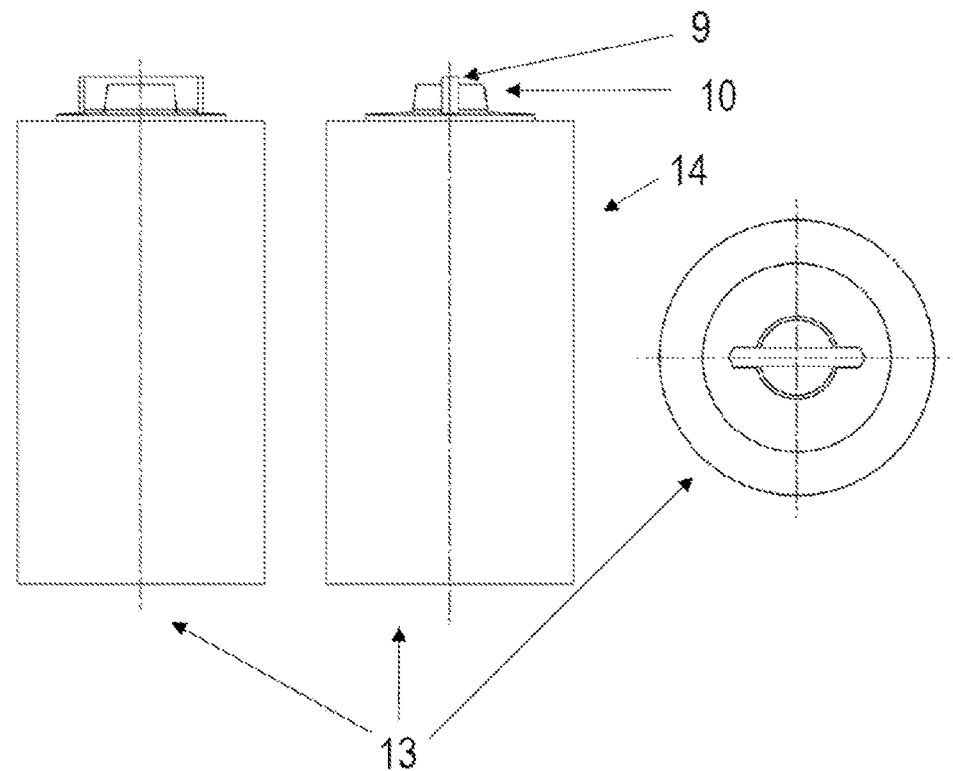

The FIGS. 9a and 9b show the forming tool according to the invention having a contact geometry in the form of a slot geometry.

Figure 10A:
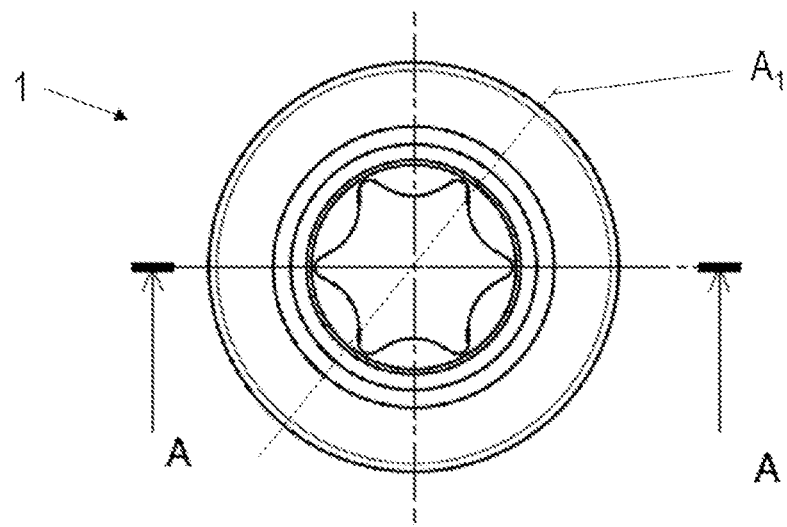
Figure 10B:
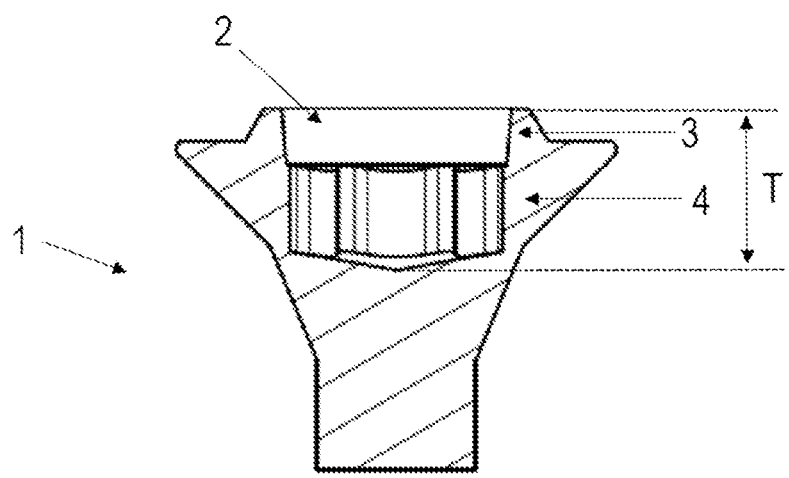

FIG. 10a and FIG. 10b show a first embodiment variant of the screw according to the invention.

Figure 11A:
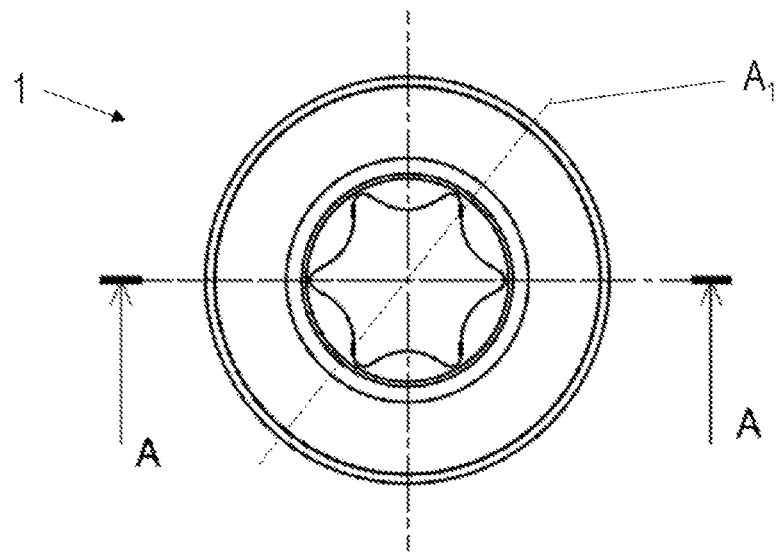
Figure 11B:
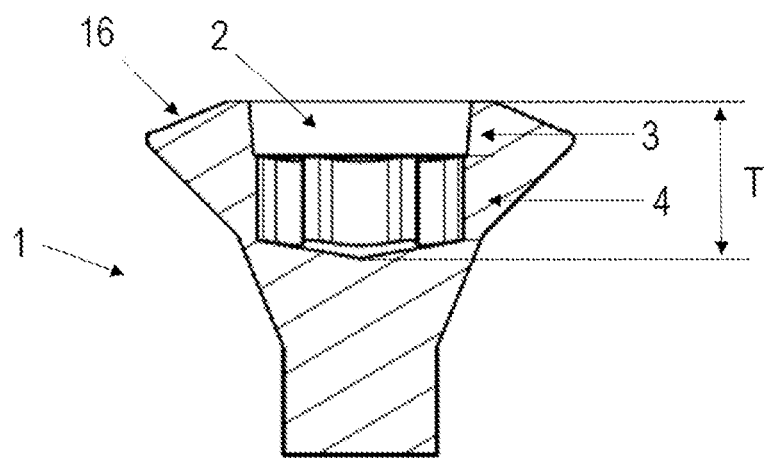

FIG. 11a and FIG. 11b show a second embodiment variant of the screw 1 according to the invention.

Figure 12A:
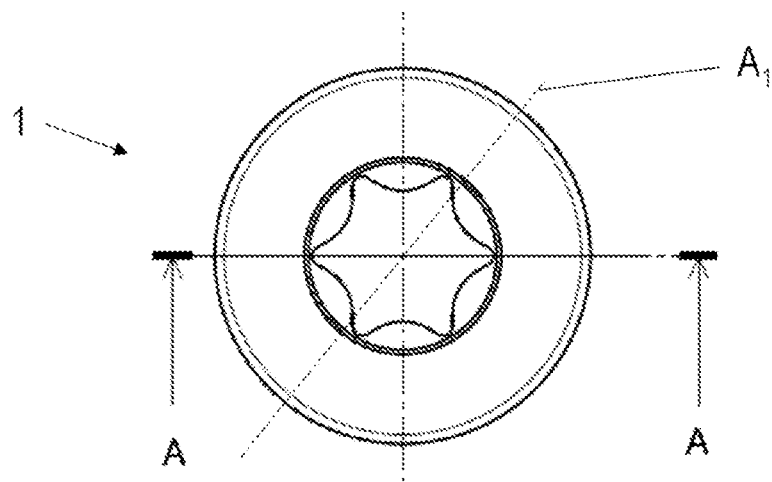
Figure 12B:
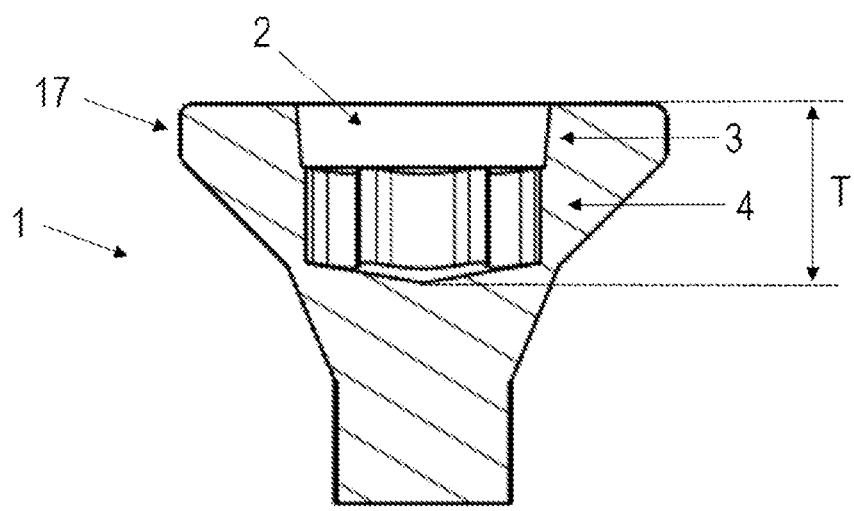

FIG. 12a and FIG. 12b show a third embodiment variant of the screw 1 according to the invention.

Figure 1A:
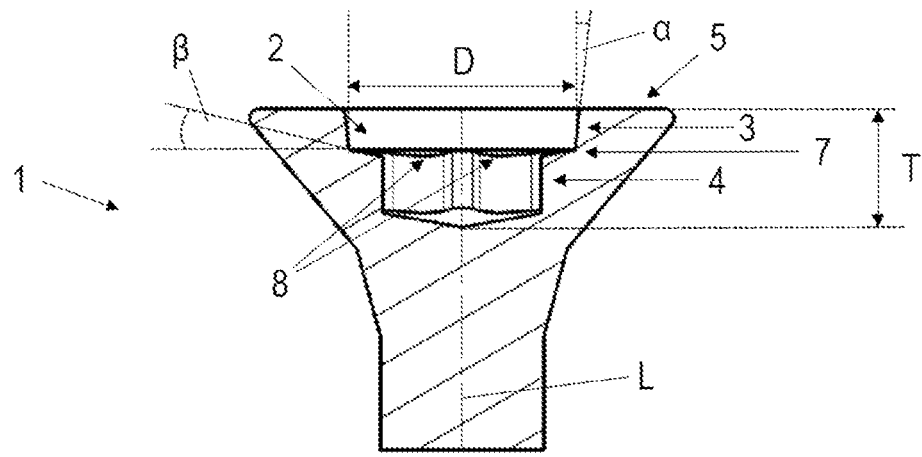
FIG. 1a shows a cross-section through a screw head of a screw according to the invention having a screw head bush according to the invention.
Figure 1B:
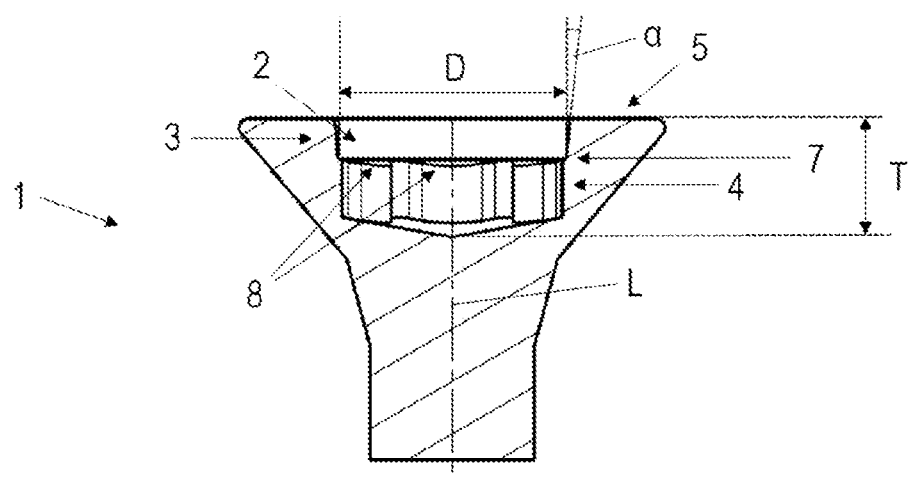
FIG. 1b shows the screw head bush according to FIG. 1a in a further cross-sectional view.
Figure 1C:
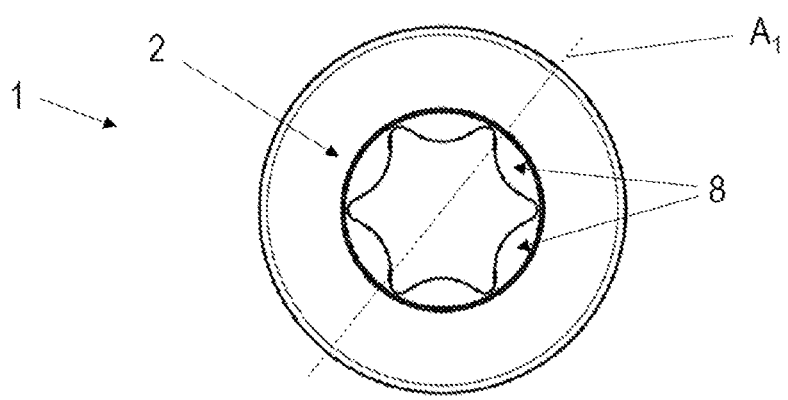
FIG. 1c shows the screw head bush according to FIG. 1a and FIG. 1b in a top view.

FIG. 1a shows a screw head of a screw 1 according to the invention in a cross-sectional view for depicting a screw head bush 2 according to the invention provided within the screw 1 according to the invention. The screw head bush 2 according to the invention has an external portion 3 and an internal portion 4, which follows the external portion 3. The external portion 3 starts at a cover surface 5 of the screw head, wherein, for screwing in the screw 1, there is inserted a screw head drive 6 according to the invention, which is depicted in the FIGS. 4a to 4c, through the external portion 3 into the internal portion 4. The external portion 3 has a larger diameter D than the internal portion 4 in at least a first axis $A_1$ oriented perpendicular to a depth T of the screw head bush 2 and visible in FIG. 1c. In this way, insertion of the screw head drive 6 into the screw head bush 2 is facilitated. The external portion 3 has essentially the shape of a truncated cone tapering towards the internal portion 4. In this way, there is provided a guide for the screw head drive 6. The internal portion 4 is configured as engagement geometry for the rotationally fixed accommodation of the screw head drive 6. As engagement geometry within the scope of the invention there may be provided any geometry for screw drives known from prior art. In particular preferred as an engagement geometry is a Phillips geometry, a Torx geometry or a slot geometry. In the FIGS. 1 to 1c, there is depicted a Torx geometry. The configuration according to the invention of the external portion 3 and of the internal portion 4 provides for an improved guide of the screw head drive 6 during insertion into the screw head bush 2 as well as a centring of the screw head drive 6 within the screw head bush 2, bevor this completely engages the engagement geometry. In this way, wear of the engagement geometry due to improperly installed screw head drives 6 will be prevented. FIG. 1b shows the screw head of the screw 1 having the screw head bush 2 according to FIG. 1a in another cross-sectional view, which is rotated by a longitudinal axis L of the screw head drive 2 in regard to FIG. 1*a*. The engagement geometry depicted in the FIGS. 1*a* to 1*c* is a Torx geometry, wherein in FIG. 1*a* there is visible a maximum diameter of the Torx geometry. FIG. 1*c* show the screw head according FIGS. 1*a* and 1*b* in a view from above, wherein the engagement geometry is visible in a top view.

The external portion 3 of the screw head bush according to the invention has a truncated cone shell inclined in regard to a cylinder shell in the range of 2.5° to 10°. The inclination of the truncated cone shell is indicated in the FIGS. 1*a* and 1*b* by the angle α. This angular range has proven to be especially advantageous in regard to an easy capability of insertion of the screw head drive 6.

The screw head bush 2 preferably comprises in addition an insertion area 7 arranged between the external portion 3 and the internal portion 4 and having insertion surfaces 8. These are visible in FIGS. 1*a*, 1*b* and 1*c*. The insertion surfaces 8 have according to the preferred embodiment of the screw head bush 2 according to the invention an inclination β of essentially 10° in regard to a base area of the truncated cone of the external portion 3, which is depicted in FIG. 1*a*. In this way, sliding a contact geometry of the screw head drive 6 into the engagement geometry of the screw head bush 2 is facilitated.

Figure 2A:
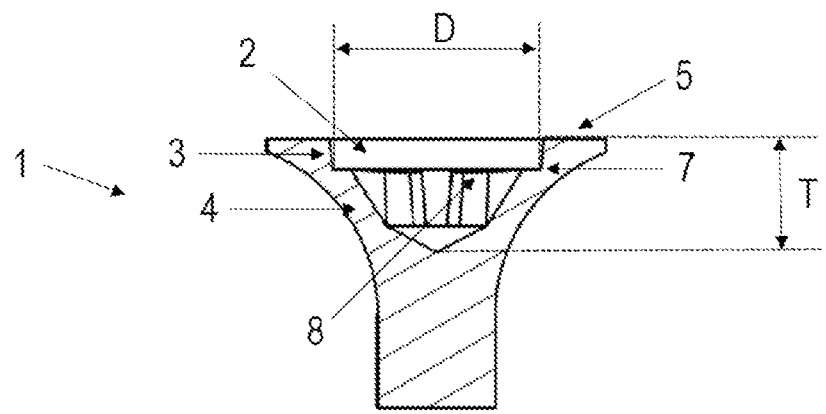
FIG. 2a, FIG. 2b and FIG. 2c show another embodiment variant of the screw head bush according to the invention having an engagement geometry in the form of a Phillips geometry.
Figure 2B:
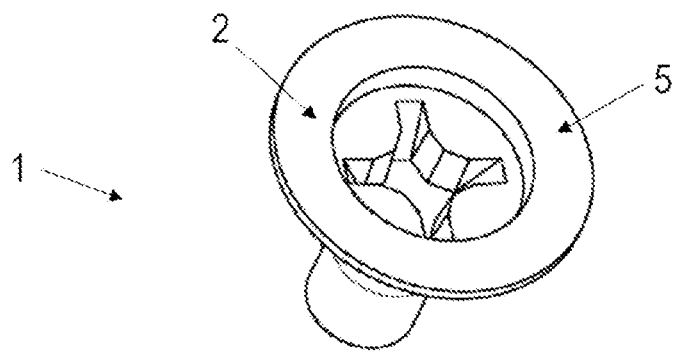
Figure 2C:
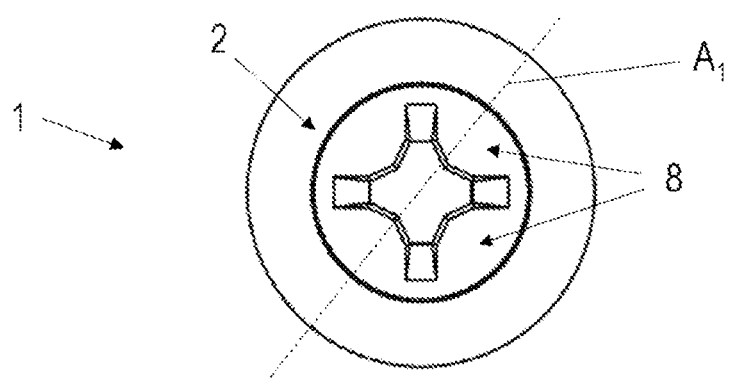
Figure 3A:
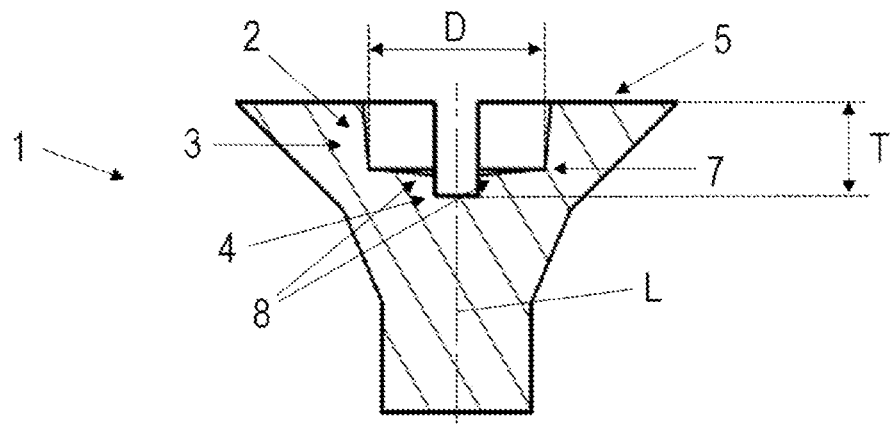
FIG. 3a, FIG. 3b and FIG. 3c show another embodiment variant of the screw head bush according to the invention having an engagement geometry in the form of a slot geometry.
Figure 3B:
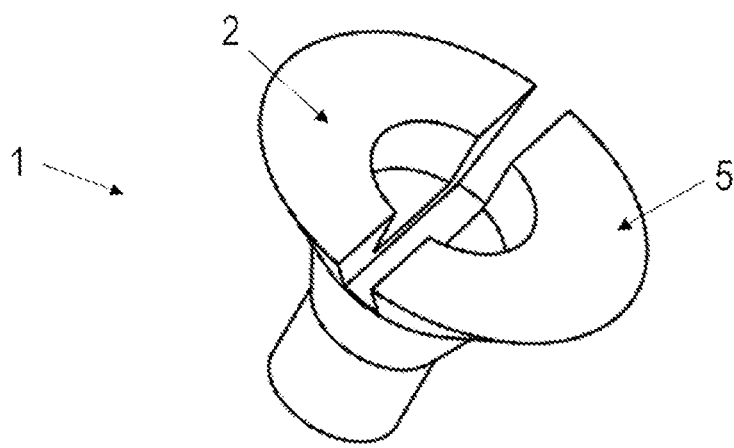
Figure 3C:
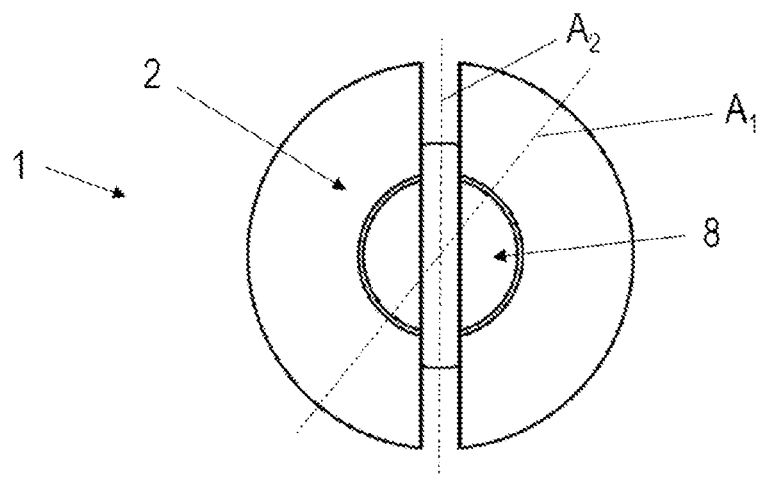

The FIGS. 2*a*, 2*b* and 2*c* show an alternative embodiment variant of the screw head bush 2 according to the invention having an engagement geometry in the form of a Philipps geometry, and the FIGS. 3*a*, 3*b* and 3*c* show another embodiment variant of the screw head bush 2 according to the invention having an engagement geometry in the form of a slot geometry.

As visible from FIG. 3*c*, the engagement geometry may be a slot geometry passing through the screw head bush 2 in a second axis $A_2$ oriented perpendicular to the depth T of the screw head bush 2 and being different from the first axis $A_1$. In this way, there is obtained the advantage that it is possible to use slot screw drivers known from prior art to drive a screw 1 equipped with the screw head bush 2 according to the invention.

Figure 4A:
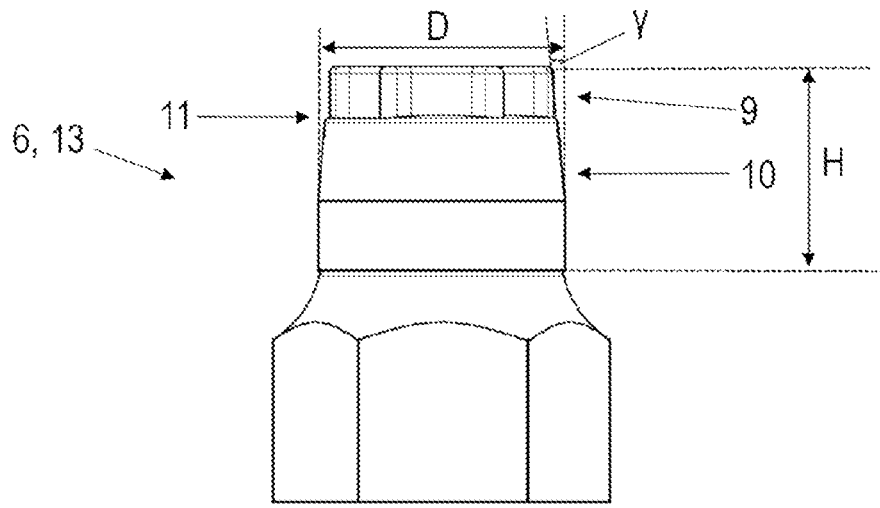
FIG. 4a shows a screw head drive according to the invention in a side view.
Figure 4B:
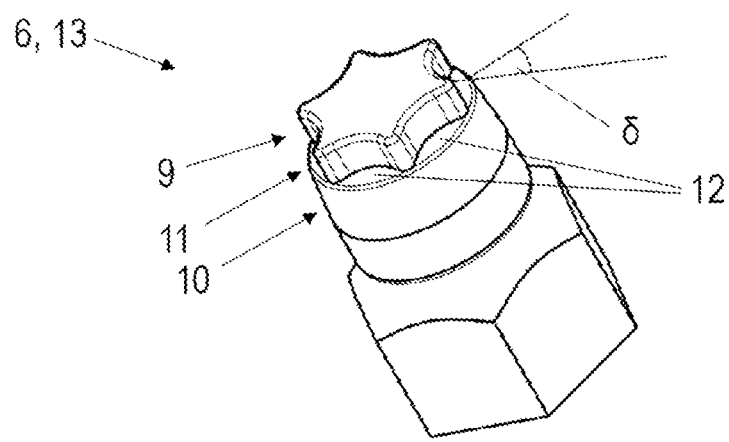
FIG. 4b shows the screw head drive according to FIG. 4a in a perspective view.
Figure 4C:
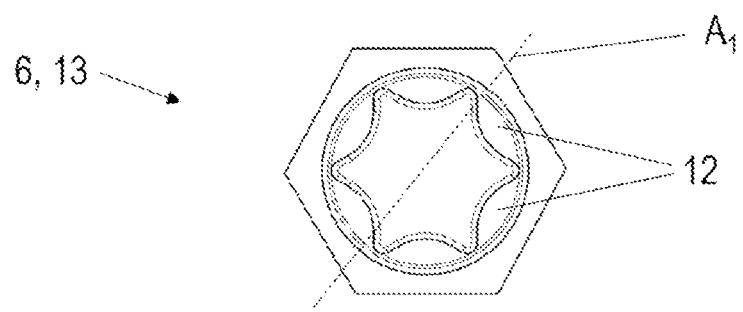
FIG. 4c shows the screw head drive according to FIG. 4a and FIG. 4b in a top view.

The screw head drive 6 according to the invention is depicted in the FIGS. 4*a*, 4*b* and 4*c*. The screw head drive 6 according to the invention has an external portion 9 and an internal portion 10 following the external portion 9, wherein the internal portion 10 has a larger diameter D than the external portion 9 in at least a first axis $A_1$ oriented perpendicular to a height H of the screw head drive 6 and visible in FIG. 4*c*. The internal portion 10 is essentially configured as a truncated cone tapering towards the external portion 9. The external portion 9 comprises a contact geometry, which is configured to engage the engagement geometry of the screw head bush 2 in a rotationally fixed manner. There may be provided as contact geometry within the scope of the invention any geometry for screw drives known from prior art. This is visible in the FIGS. 4*b* and 4*c* in detail. In the FIGS. 4*a* to 4*c*, there is depicted a Torx geometry. In particular there is preferred as a contact geometry a Philipps geometry, a Torx geometry or a slot geometry. The screw head drive 6 and the screw head bush 2 represent geometric shapes that are essentially complementary to one another. Due to the cone-like tapering internal portion 10 of the screw head drive 6, there is provided a guide by cooperation with the cone-like embodiment of the external portion 3 of the screw head bush 2, whereby there is prevented that the contact geometry of the screw head drive 6 is inserted into an engagement geometry of the screw head bush 2 in an inclined way. In this manner, improper insertion of the screw head drive 6 into the screw head bush 2 is prevented, and slipping of the screw head drive 6 within the screw head bush 2 is avoided.

The internal portion 10 of the screw head drive 6 according to the invention comprises a truncated cone shell inclined in regard to a cylinder shell in the range of 2.5° to 10°. This inclination is indicated in FIG. 4*a* using the inclination angle γ. This angular range has proven to be especially advantageous in regard to an easy capability of insertion of the screw head drive 6.

The screw head drive 6 preferably comprises an insertion area 11 arranged between the external portion 9 and the internal portion 10 and having insertion surfaces 12. These insertion surfaces 12 are visible in FIG. 4*b* and FIG. 4*c*. The insertion surfaces 12 preferably have an inclination δ of essentially 10° in regard to a base area of the truncated cone of the internal portion 10, which is visible in FIG. 4*b*. In this way, sliding of the contact geometry of the screw head drive 6 into the engagement geometry of the screw head bush 2 is facilitated.

Figure 5A:
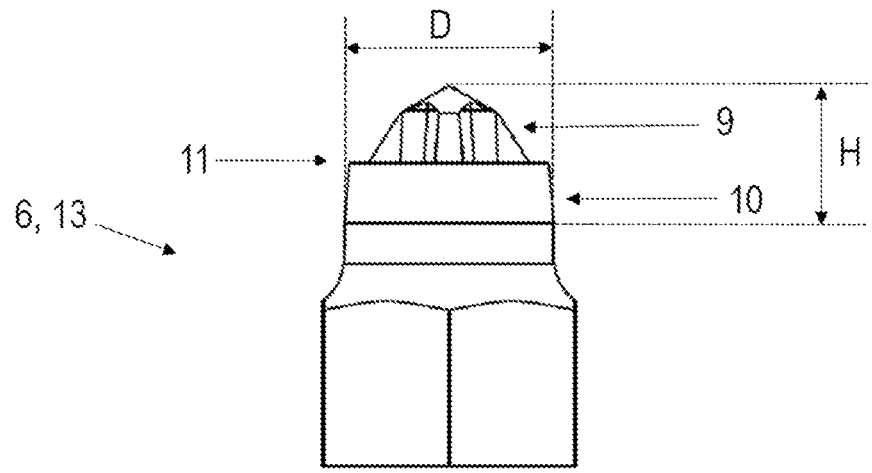
FIG. 5a, FIG. 5b and FIG. 5c show another embodiment variant of the screw head drive according to the invention having a contact geometry in the form of a Phillips geometry.
Figure 5B:
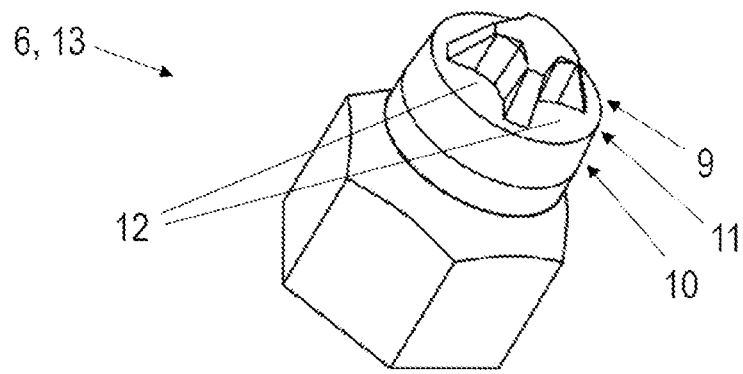
Figure 5C:
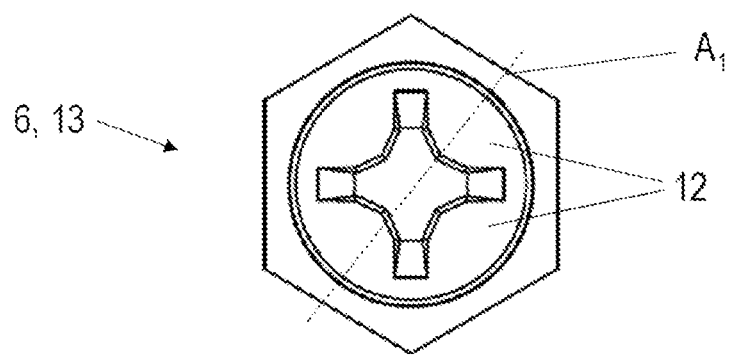
Figure 6A:
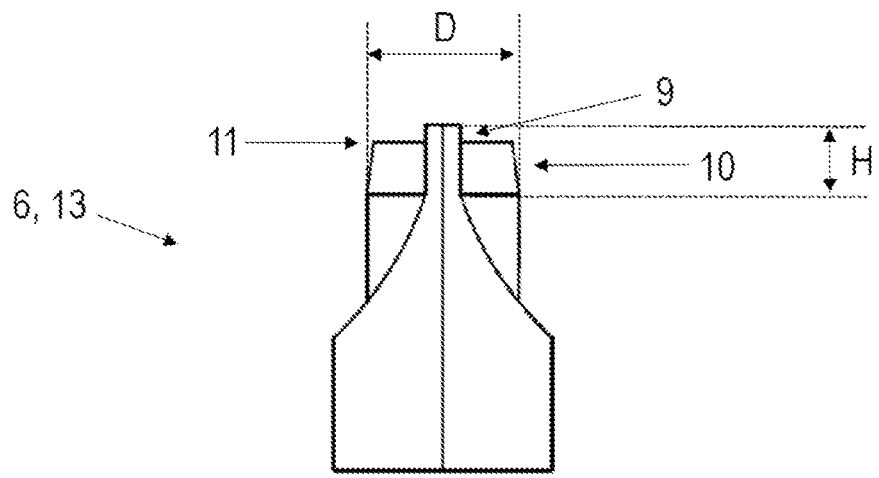
FIG. 6a, FIG. 6b and FIG. 6c show another embodiment variant of the screw head drive according to the invention having a contact geometry in the form of a slot geometry.
Figure 6B:
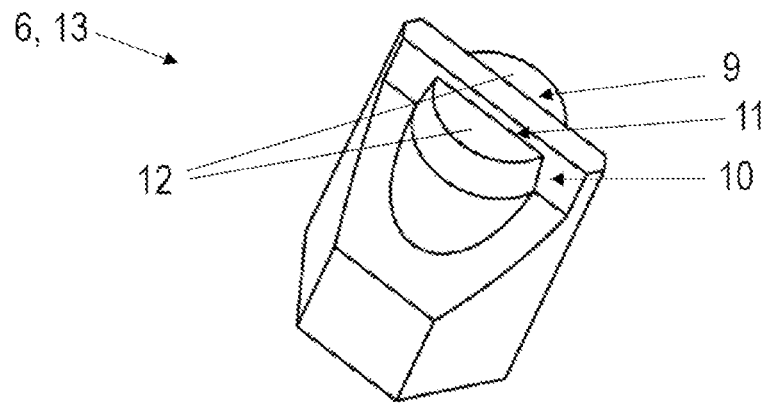
Figure 6C:
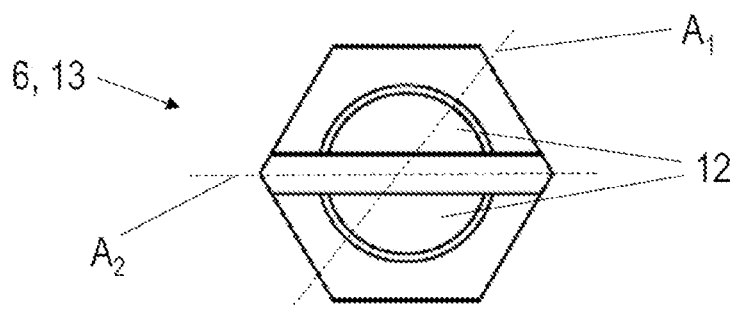

The FIGS. 5*a*, 5*b* and 5*c* show an alternative embodiment variant of the screw head drive 6 according to the invention having a contact geometry in the form of a Philipps geometry, and the FIGS. 6*a*, 6*b* and 6*c* show another embodiment variant of the screw head drive 6 according to the invention having a contact geometry in the form of a slot geometry.

As visible from FIG. 6*c*, the contact geometry may be a slot geometry passing through the screw head drive 6 in a second axis $A_2$ oriented perpendicular to the height H of the screw head drive 6 and being different from the first axis $A_1$.

A forming tool 13 according to the invention for forming a screw head bush 2 within a screw head is used in the production of screws to form within a screw head of a screw blank the screw head bush 2 according to the invention. This forming tool 13 has essentially the same geometry as the screw head drive 6 according to the invention. The forming tool 13 and the screw head bush 2, hence, represent geometrical shapes that are essentially complementary to one another. The FIGS. 4*a*, 4*b* and 4*c*, 5*a*, 5*b* and 5*c* as well as 6*a*, 6*b* and 6*c*, hence, show as an example also an upper portion of the forming tool 13 according to the invention.

The forming tool 13 for forming the screw head bush 2 within a screw head comprises, like the screw head drive 6, an external portion 9 and an internal portion 10 following the external portion 9, wherein the internal portion 10 has a larger diameter D than the external portion 9 in at least a first axis $A_1$ oriented perpendicular to a height H of the forming tool 13. The internal portion 10 is essentially configured as a truncated cone tapering towards the external portion 9, and the external portion 10 comprises a contact geometry, which is configured to form within the screw head an engagement geometry for the rotationally fixed accommodation of the screw head drive 6. Within the scope of the invention, any geometry for screw drives known from prior art may be provided as a contact geometry or engagement geometry, respectively.

The internal portion 10 of the forming tool 13 preferably comprises a truncated cone shell inclined in regard to a cylinder shell in the range of 2.5° to 10°. This inclination is indicated in FIG. 4*a* with the inclination angle γ. This angular range has proven to be especially advantageous in regard to the easy capability of insertion of the screw head drive 6.

According to the preferred embodiment of the forming tool 13 according to the invention, this comprises an insertion area 11 arranged between the external portion 9 and the internal portion 10 and having insertion surfaces 12. The insertion surfaces 12 preferably have an inclination δ of essentially 10° in regard to a base area of the truncated cone of the internal portion 10, which is visible in FIG. 4b. In this way, sliding of the contact geometry of the screw head drive 6 into the engagement geometry of the screw head bush 2 is facilitated.

The FIGS. 5a, 5b and 5c show an alternative embodiment variant of the forming tool 13 according to the invention having a contact geometry in the form of a Philipps geometry, and the FIGS. 6a, 6b and 6c show another embodiment variant of the forming tool 13 according to the invention having a contact geometry in the form of a slot geometry.

As visible in FIG. 6c, the contact geometry may be a slot geometry passing through the forming tool 13 in a second axis $A_2$ oriented perpendicular to the height H of the screw head drive 6 and being different from the first axis $A_1$.

The FIGS. 7a to 9b show the forming tool 13 according to the invention in essentially complete depictions, wherein the forming tool 13 comprises a portion 14 for attaching the forming tool 13 in a screw production device. The FIGS. 7a and 7b show the forming tool 13 according to the invention having a contact geometry in the form of a Torx geometry in two different sizes. The FIGS. 8a and 8b show the forming tool 13 according to the invention having a contact geometry in the form of a Phillips geometry in two different sizes, and the FIGS. 9a and 9b show the forming tool 13 according to the invention having a contact geometry in the form of a slot geometry in two different sizes.

A kit according to the invention comprises a screw 1 according to the invention and a screw head drive 6 according to the invention. The internal portion 10 of the screw head drive 6 of the kit according to the invention has a truncated cone shell having a larger inclination angle γ in regard to a cylinder shell than a truncated cone shell of the external portion 3 of the screw head bush 2 of the screw 1 according to the invention. In this way, when placing the screw head drive 6 into the screw head bush 2 of the screw 1, there is achieved a form-fit between the truncated cone shells of the screw head bush 2 and of the screw head drive 6, and the screw 1 is stuck on the screw head drive 6. This has the advantage that the screw 1 may be easily, without being held, placed onto a workpiece and then screwed in. in addition, there need not be provided any magnetic elements within the screw drive head 6. Tests have shown that the screw head drives currently commercially available are in general over dimensioned.

For example, a TX 25 drive known from prior art may transmit in a wooden screw having a diameter of 4 mm a multiple of the fractional torque of the screw, as the drive has a relatively large depth. This knowledges will be utilized within the scope of the invention, as there is consequently not needed the entire depth of the drive to screw in a screw. According to the invention, hence, a part of the depth will be used for a self-adhering form-fit in order to retain the screw 1 at the screw head drive 6. The different angles α and γ of the two truncated cone shells of screw head drive 6 and screw head bush 2, such as, for example, 5° at the screw head bush 2 and 10° at the screw head drive 6, result in a very effective form-fit retaining the screw 1 at the screw head drive 6. This inventive effect may be used at any form of a screw drive geometry. Another advantage is the clear guide in the axial direction of the screw head drive 6. In this way, it is made impossible to install the screw head drive 6 on the screw 1 in an inclined or oblique way, whereby undesired rubbing of the screw head bush 2 and/or excessive wear of the screw head drive 6 will be minimized or even completely prevented.

FIG. 10a and FIG. 10b show a first embodiment variant of the screw 1 according to the invention. FIG. 10a shows the screw 1 in a top view, and FIG. 10b shows a sectional view of the screw of FIG. 10a along the line A-A. In this embodiment variant the screw 1 has a protrusion ring-like revolving around the external portion 3 of the screw head bush 2 and extending essentially in the direction of the longitudinal axis of the screw 1. The protrusion 15 has preferably a height of 0.75 mm. The protrusion 15 has the advantage that this provides for an additional depth T of the screw head bush 2, whereby the external portion 3 may extend at least in part within the protrusion 15. In this way, the depth of the internal portion 4 may be increased, whereby there is achieved a larger force-transmitting contact surface between the engagement geometry of the screw head bush 2 and the contact geometry of the screw head drive 6.

FIG. 11a and FIG. 11b show a second embodiment variant of the screw 1 according to the invention, wherein the screw 1 has a cover surface 16 essentially ring-like revolving around the external portion 3 of the screw head bush 2 and declining outwards in the radial direction of the screw 2. The cover surface 16 preferably declines across a height of 0.75 mm. FIG. 11a shows the screw 1 in a top view, and FIG. 11b shows a sectional view of the screw of FIG. 11a along the line A-A. Due to the shape of the cover surface 13, there is obtained, like in the first embodiment variant of the screw 1 according to the invention, the technical effect that there is provided an additional depth T of the screw head bush 2.

FIG. 12a and FIG. 12b show a third embodiment variant of the screw 1 according to the invention. FIG. 12a shows the screw 1 in a top view, and FIG. 12b shows a sectional view of the screw of FIG. 12a along the line A-A. According to this embodiment variant, the screw 1 has an external surface 17 extending in the longitudinal direction of the screw 1 and essentially completely revolving around the external portion 3 of the screw head bush 2. The external surface 17 preferably has a height of 1.31 mm. The external surface 17 also provides for an additional depth T of the screw head bush 2, as well as additional mechanical stability of the external portion 3.

A TX25 drive known from prior art has a depth T of the screw head bush in the range of 1.9 mm-2.3 mm. These depths T are usually obtained in the case of a diameter of the screw head bush in the range of 5 mm and a head diameter of 9.5 mm-10 mm. The height of the screw head hereby is 4.8 mm-5.2 mm.

The screw 1 according to the invention has according to a defined screw size a height of the screw head in the range of 5.75 mm, wherein the depth of the engagement geometry of the internal portion 4 is preferably about 1.95 mm. The head diameter of the screw 1 in this regard is about 10 mm. With any other screw sizes, these values will be scaled, according to the ratio thereof.

The invention claimed is:

1. A kit comprising:
   a screw comprising a screw head bush and the screw head bush has an external portion and an internal portion following the external portion; and
   a screw head drive having an external portion and an internal portion following the external portion;
   wherein:
   the external portion of the screw head bush has a larger diameter than the internal portion of the screw head bush at least in a first axis oriented perpendicular to a depth of the screw head bush, and
   the external portion of the screw head bush is configured as a truncated cone tapering towards the internal portion of the screw head bush and the internal portion of the screw head bush is configured as engagement geometry for a rotationally fixed accommodation of the screw head drive; and wherein:

the internal portion of the screw head drive has a larger diameter than the external portion of the screw head drive in at least a first axis oriented perpendicular to a height of the screw head drive, the internal portion of the screw head drive is configured as a truncated cone tapering towards the external portion of the screw head drive, the external portion of the screw head drive comprises a contact geometry, the contact geometry is configured to engage the engagement geometry of the screw head bush in a rotationally fixed manner, and the internal portion of the screw head drive has a larger inclination angle than a truncated cone shell of the external portion of the screw head bush of the screw in regard to a cylinder shell.

2. The kit according to claim 1, wherein the external portion of the screw head bush comprises a truncated cone shell inclined in an angular range of 2.5° to 10° in regard to a cylinder shell.

3. The kit according claim 1, wherein the engagement geometry of the screw head bush is a cross-slotted geometry, a hexalobular geometry or a slot geometry.

4. The kit according to claim 1, wherein the engagement geometry of the screw head bush is a slot geometry passing through the screw head bush in a second axis oriented perpendicular to the depth of the screw head bush and being different from the first axis.

5. The kit according to claim 1, wherein the internal portion of the screw head drive comprises a truncated cone shell inclined in regard to a cylinder shell in an angular range of 2.5° to 10°.

6. The kit according to claim 1, wherein the contact geometry of the screw head drive is a cross geometry, a hexalobular geometry or a slot geometry.

7. The kit according to claim 1, wherein the contact geometry of the screw head drive is a slot geometry passing through the screw head drive in a second axis oriented perpendicular to the height of the screw head drive and being different from the first axis.

8. The kit according to claim 1, characterized in wherein the screw has a protrusion ring-like revolving around the external portion of the screw head bush and extending in a direction of a longitudinal axis of the screw.

9. The kit according to claim 1, wherein the screw has a cover surface ring-like revolving around the external portion of the screw head bush and declining outwards in a radial direction of the screw.

10. The kit according to claim 1, wherein the screw has an external surface extending in a longitudinal direction of the screw and completely revolving around the external portion of the screw head bush.

* * * * *